US012564894B2

(12) United States Patent
Xu et al.

(10) Patent No.: US 12,564,894 B2
(45) Date of Patent: Mar. 3, 2026

(54) FOLLOW-UP SWING HEAD TYPE LARGE TAPER WIRE CUTTING DEVICE

(71) Applicant: CHANGZHOU INSTITUTE OF TECHNOLOGY, Changzhou (CN)

(72) Inventors: Bo Xu, Changzhou (CN); Hui Yu, Changzhou (CN); Jianhui Bai, Changzhou (CN)

(73) Assignee: CHANGZHOU INSTITUTE OF TECHNOLOGY, Changzhou (CN)

( * ) Notice: Subject to any disclaimer, the term of this patent is extended or adjusted under 35 U.S.C. 154(b) by 867 days.

(21) Appl. No.: 17/800,921

(22) PCT Filed: Dec. 9, 2020

(86) PCT No.: PCT/CN2020/134731
§ 371 (c)(1),
(2) Date: Aug. 19, 2022

(87) PCT Pub. No.: WO2021/164383
PCT Pub. Date: Aug. 26, 2021

(65) Prior Publication Data
US 2023/0070464 A1    Mar. 9, 2023

(30) Foreign Application Priority Data

Feb. 19, 2020    (CN) .......................... 202010102349.1

(51) Int. Cl.
*B23H 7/02*        (2006.01)
*B23H 7/10*        (2006.01)
*B23H 7/30*        (2006.01)

(52) U.S. Cl.
CPC ............... *B23H 7/02* (2013.01); *B23H 7/105* (2013.01); *B23H 7/30* (2013.01)

(58) Field of Classification Search
CPC .......... B23H 7/02; B23H 7/104; B23H 7/105; B23H 7/30
See application file for complete search history.

(56) References Cited

U.S. PATENT DOCUMENTS

2014/0236341 A1*   8/2014  Nishikawa ............. B23H 7/065
                                                     700/162
2016/0039025 A1*   2/2016  Nishikawa ............... B23H 7/02
                                                     219/69.12
2018/0029153 A1*   2/2018  Ookubo ................... B23H 7/18

FOREIGN PATENT DOCUMENTS

CN        2302862      1/1999
CN        2436258      6/2001
                 (Continued)

*Primary Examiner* — Steven W Crabb
*Assistant Examiner* — Dilnessa B Belay
(74) *Attorney, Agent, or Firm* — Bayramoglu Law Offices

(57)            ABSTRACT
A follow-up swing head type large taper wire cutting device is disclosed. In the large taper wire cutting device, swing heads on upper and lower mechanical arms are adjusted in a follow-up way by swing head rotating mechanisms in coordination with a cutting taper, universal wire guide wheels are used to cooperate with the corresponding upper and lower swing heads, and tensioning mechanisms between the universal wire guide wheels and directional wire guide wheels are used for transition to ensure the smooth transition of an electrode wire, so that the electrode wire is effectively prevented from sliding off during large taper cutting, and the control of the follow-up deflection position of the electrode wire is also very accurate.

16 Claims, 4 Drawing Sheets

(56)     References Cited

FOREIGN PATENT DOCUMENTS

| | | | |
|---|---|---|---|
| CN | 204934785 | | 1/2016 |
| CN | 106312210 | | 1/2017 |
| CN | 108436208 | A | 8/2018 |
| CN | 110524075 | A | 12/2019 |
| CN | 111136356 | A | 5/2020 |
| JP | H04343619 | | 11/1992 |
| KR | 101017353 | | 2/2011 |

* cited by examiner

FOLLOW-UP SWING HEAD TYPE LARGE TAPER WIRE CUTTING DEVICE

CROSS REFERENCE TO THE RELATED APPLICATIONS

This application is the national phase entry of International Application No. PCT/CN2020/134731, filed on Dec. 9, 2020, which is based upon and claims priority to Chinese Patent Application No. 202010102349.1, filed on Feb. 19, 2020, the entire contents of which are incorporated herein by reference.

TECHNICAL FIELD

The present invention relates to an electric spark wire cutting device, and more specifically relates to a follow-up swing head type large taper wire cutting device.

BACKGROUND

Electric spark wire cutting equipment is widely used in machining. The basic working principle of the electric spark wire cutting equipment is to use a continuously moving thin electrode wire (metal wire) as an electrode to perform pulse spark amplification on a workpiece for removing metals, cutting and forming. The electric spark wire cutting equipment is mainly used for processing various precise and small workpieces with complex shapes, such as various micro holes, slits and curves. Due to the advantages of small processing allowance, high cutting accuracy and low manufacturing cost, the wire cutting has been widely used in production.

As the requirements for processing parts are getting higher and higher, taper processing requirements are also put forward for the wire cutting, that is, it requires that the wire cutting can cut parts with a taper. Therefore, in the existing wire cutting equipment, on the basis of traditional X, Y and Z axes, a U axis and a V axis are additionally provided. The position of an upper mechanical arm is adjusted by the U axis and the V axis, so that an electrode wire forms an inclination angle for taper cutting. The Chinese patent application 201910417071.4 disclosed a large taper mechanism for an electric spark wire cutting machine tool on Dec. 3, 2019. The application relates to a large taper mechanism for an electric spark wire cutting machine tool, consisting of an upper connecting rod, a swing rod, a lower arm, an upper swing rod sleeve, a lower swing rod sleeve, etc. One side of the upper connecting rod is connected with an upper part of the swing rod through the upper swing rod sleeve, the other side of the upper connecting rod is sleeved with an upper guide sleeve, and an upper guide wheel stock provided with an upper main guide wheel is fixedly connected with the upper guide sleeve. One side of the lower arm is hinged to a lower part of the swing rod through the lower swing rod sleeve, and the other side is provided with a lower guide wheel stock and a lower main guide wheel. The center of the upper main guide wheel is located on a center line of the upper connecting rod, and intersects with a center line of the swing rod in the same plane. The center of the lower main guide wheel is located on a rotating center line of the lower swing rod sleeve, and intersects with the center line of the swing rod in the same plane. The mechanism also includes a follow-up guide wheel mounted on the upper guide sleeve, and an electrode wire enters an upper auxiliary guide wheel through the follow-up guide wheel and then enters the upper main guide wheel. The patent application can ensure the taper processing accuracy of the swing rod during operation, and the swing action takes up little space. However, spindle heads of the existing wire cutting machine tools are all fixed, and the deflection of the electrode wire is controlled by wire guide nozzles on upper and lower spindle heads, which is feasible for a small angle. However, when a large taper is cut, the electrode wire is easy to fall off from the wire guide wheel, or the wire guide nozzle makes the electrode wire bend too much, which increases the friction force, accelerates the wear of the wire guide nozzle and the electrode wire, shortens the service life and reduces the processing accuracy.

In order to facilitate the adjustment of the direction of an electrode wire, the Chinese patent application 201810493752.4 disclosed an "electric spark wire cutting machine tool for wire moving in a large taper". The electric spark wire cutting machine tool for wire moving in a large taper includes a support mechanism, a wire storing mechanism, a taper mechanism and a bearing mechanism. The wire storing mechanism, the taper mechanism and the bearing mechanism are mounted on the support mechanism. The wire storing mechanism is provided with a containing structure for placement of a cutting wire, and the taper mechanism is located on one side of the wire storing mechanism. The cutting wire is delivered to the taper mechanism by the wire storing mechanism, and the angle of the cutting wire is adjusted by the taper mechanism. The bearing mechanism is located below the taper mechanism, and the bearing mechanism is provided with a positioning structure for fixing a workpiece. The workpiece on the bearing mechanism is cut by the cutting wire on the taper mechanism, and the cutting wire is returned to the wire storing mechanism by the taper mechanism. The positions and directions of the taper mechanism and the bearing mechanism are adjusted in real time by a control cabinet according to process requirements, which is favorable for increasing the control efficiency and improving the cutting accuracy, thereby increasing the work efficiency and improving the product quality. In both upper and lower overhanging rails of the patent application, a vertical motor is used for adjusting the deflection of a wire guide wheel, and a transverse motor is used for adjusting the deflection of a wire guide head, so as to meet the inclination requirement for an electrode wire in a taper cutting process, thereby effectively solving the technical problems of the above wire cutting machine tool during large taper cutting.

However, the cutting of parts by the wire cutting machine tool needs to rely on the multi-axis linkage of the wire cutting machine tool, and the structural design of the wire cutting machine tool is also crucial to the processing control and operation complexity and processing accuracy. The existing wire cutting machine tools mainly have the following defects that need to be solved urgently: 1. In the patent application 201810493752.4, only the taper processing follow-up deflection of a front wire guide wheel of an overhanging rail is considered. However, the electrode wire moves continuously in the wire cutting process, so that other wire guide mechanisms also need to be considered to realize the stability of the electrode wire. After the front wire guide wheel deflects, there is a deviation between the angle of the front wire guide wheel and the angles of other wire guide wheels, which may easily cause the electrode wire to slide off during processing and cause processing faults.

2. The deflection action of the front wire guide wheel of the overhanging rail not only makes the electrode wire between upper and lower overhanging rails incline, but also makes the length of the electrode wire change to a certain extent, causing a change in the tensioning force of the electrode wire. Therefore, it is also necessary to consider designing an appropriate tensioning device to adapt to the smooth transition of the inclining movement of the electrode wire.

3. The wire cutting of complex shapes is a multi-axis linkage process. The U and V axes of the wire cutting machine tool are mainly used for controlling the movement of an upper overhanging rail (upper mechanical arm) relative to a lower overhanging rail, which makes the electrode wire between the upper and lower overhanging rails incline. However, in the existing wire cutting machine tool, a Z-axis mechanism is mounted on the upper overhanging rail (as described in the above two patent applications), which increases the weight of the overhanging rail side of the upper overhanging rail. Therefore, the structural strength and stability of U and V axes drive mechanisms are required to be higher, which may easily cause the upper overhanging rail to vibrate and reduce the processing accuracy.

SUMMARY

1. Technical Problems to be Solved by the Present Invention

An objective of the present invention is to provide a follow-up swing head type large taper wire cutting device to overcome the defect that in an existing wire cutting device, the design of a large taper cutting deflection structure is not comprehensive, which causes an electrode wire to slide off easily. With the technical solution of the present invention, swing heads on upper and lower mechanical arms are adjusted in a follow-up way by swing head rotating mechanisms in coordination with a cutting taper, universal wire guide wheels are used to cooperate with the corresponding upper and lower swing heads, and tensioning mechanisms between the universal wire guide wheels and directional wire guide wheels are used for transition to ensure the smooth transition of an electrode wire, so that the electrode wire is effectively prevented from sliding off during large taper cutting, and the control of the follow-up deflection position of the electrode wire is also very accurate.

Another objective of the present invention is to optimize a multi-axis linkage structure of the existing wire cutting device, so as to reduce the vibration of the electrode wire in the wire cutting process. With the technical solution of the present invention, a U axis and a V axis are arranged on a Z-axis table, the upper mechanical arm is mounted on a V-axis table, and the weight of the upper mechanical arm is reduced, thereby facilitating the improvement of the operation stability and reliability of U-axis and V-axis drive mechanisms, reducing the vibration of the upper mechanical arm during processing, improving the accuracy of the wire cutting process, and prolonging the service life of the large taper wire cutting device.

2. Technical Solution

In order to achieve the above objectives, the technical solution provided by the present invention is as follows:

A follow-up swing head type large taper wire cutting device of the present invention includes: a bed, an X-axis table, an X-axis drive mechanism, a Y-axis table, a Y-axis drive mechanism, a spindle, a Z-axis table, a Z-axis drive mechanism, a U-axis table, a U-axis drive mechanism, a V-axis table, a V-axis drive mechanism, an upper mechanical arm, an upper swing head, a lower mechanical arm, a lower swing head, an electrode wire and a wire moving mechanism, wherein the X-axis table is mounted on the bed through the X-axis drive mechanism, the Y-axis table is mounted on the X-axis table through the Y-axis drive mechanism, the spindle is vertically mounted on the Y-axis table, the lower mechanical arm is fixedly mounted at a lower end of the spindle or on the Y-axis table, the lower swing head is mounted at a front end of the lower mechanical arm through a lower swing head rotating mechanism, the Z-axis table is mounted on the spindle through the Z-axis drive mechanism, the U-axis table is mounted on the Z-axis table through the U-axis drive mechanism, the V-axis table is mounted on the U-axis table through the V-axis drive mechanism, the upper mechanical arm is fixedly mounted on the V-axis table, the upper swing head is mounted at a front end of the upper mechanical arm through an upper swing head rotating mechanism, and the upper mechanical arm is parallel to the lower mechanical arm; and universal wire guide wheels, tensioning mechanisms and directional wire guide wheels are respectively arranged in the upper mechanical arm and the lower mechanical arm, the electrode wire is led out by the wire moving mechanism, sequentially passes through the directional wire guide wheel, the tensioning mechanism and the universal wire guide wheel in the upper mechanical arm, is then wound on the upper swing head and turned by the upper swing head, and is then wound on the lower swing head, and the electrode wire turned by the lower swing head sequentially passes through the universal wire guide wheel, the tensioning mechanism and the directional wire guide wheel in the lower mechanical arm.

Further, the universal wire guide wheels, the tensioning mechanisms and the directional wire guide wheels in the upper mechanical arm and the lower mechanical arm are sequentially arranged from the near to the distant relative to the corresponding upper swing head or lower swing head.

Further, the upper swing head rotating mechanism and the lower swing head rotating mechanism have the same structure and each include a gearbox and a servo motor, and the servo motor is in transmission connection with the corresponding upper swing head or lower swing head through the gearbox.

Further, the upper swing head and the lower swing head have the same structure and each include a swing head bracket, a rotation axis and a swing wire guide wheel, an axle of the swing wire guide wheel is mounted on the swing head bracket, the rotation axis is fixed to the swing head bracket, an axial line of the rotation axis is perpendicular to an axial line of the swing wire guide wheel, the axial line of the rotation axis is located on a neutral plane of the swing wire guide wheel, the rotation axis is mounted at the front end of the corresponding upper mechanical arm or lower mechanical arm through a bearing, and the rotation axis is in transmission connection with an output axis of the gearbox of the corresponding upper swing head rotating mechanism or lower swing head rotating mechanism.

Further, the tensioning mechanism includes a support, a slide block, a tensioning wire guide wheel and a balancing weight, the slide block is slidably mounted in a vertical guide chute of the support, the tensioning wire guide wheel is mounted on the slide block, and a lower end of the slide block is connected with the balancing weight through a pull rope.

Further, the width of a race of the tensioning wire guide wheel is greater than the width of a race of the universal wire guide wheel and the directional wire guide wheel.

Further, the balancing weight is a weight.

Further, the wire moving mechanism includes a wire traveling mechanism and an electrode wire disc; the electrode wire disc is mounted on the upper mechanical arm through a wire disc mounting frame, and the wire traveling mechanism is mounted in the lower mechanical arm and is located at a rear part of the directional wire guide wheel in the lower mechanical arm; and the electrode wire is led out by the electrode wire disc, sequentially passes through the directional wire guide wheel, the tensioning mechanism and the universal wire guide wheel in the upper mechanical arm, is then wound on the upper swing head and turned by the upper swing head, and is then wound on the lower swing head, and the electrode wire turned by the lower swing head sequentially passes through the universal wire guide wheel, the tensioning mechanism and the directional wire guide wheel in the lower mechanical arm, and then enters the wire traveling mechanism.

Further, a wire collecting ring mounted on the wire disc mounting frame is also arranged on one side of the electrode wire disc, and the electrode wire in the electrode wire disc is led out and then passes through the wire collecting ring.

Further, the wire traveling mechanism includes a mounting frame, a fixed pressure roller, a reversing valve and cylinder, a piston rod, a clamping pressure roller and a carbon brush, the fixed pressure roller adopts a roller with a motor transmission device inside, the fixed pressure roller is mounted on the mounting frame and is slidably connected with the carbon brush, the carbon brush is electrically connected with a power source so as to supply the processing current of the power source to the electrode wire through the carbon brush and the fixed pressure roller, the reversing valve and cylinder is fixed to an upper part of the mounting frame, the clamping pressure roller is mounted on the piston rod of the cylinder in the reversing valve and cylinder, the clamping pressure roller is located at an upper part of the fixed pressure roller, and an axial line of the clamping pressure roller is parallel to an axial line of the fixed pressure roller.

3. Advantages

Compared with the existing known technology, the technical solution provided by the present invention has the following significant effects:
(1) A follow-up swing head type large taper wire cutting device of the present invention includes a bed, an X-axis table, an X-axis drive mechanism, a Y-axis table, a Y-axis drive mechanism, a spindle, a Z-axis table, a Z-axis drive mechanism, a U-axis table, a U-axis drive mechanism, a V-axis table, a V-axis drive mechanism, an upper mechanical arm, an upper swing head, a lower mechanical arm, a lower swing head, an electrode wire and a wire moving mechanism. On the basis of constructing X-axis, Y-axis and Z-axis numerical control devices on the bed, a U axis and a V axis are established on a Z axis, the upper mechanical arm is mounted on the V-axis table, and the weight of the upper mechanical arm is reduced, thereby facilitating the improvement of the operation stability and reliability of the U-axis and V-axis drive mechanisms, reducing the vibration of the upper mechanical arm during processing, improving the accuracy of the wire cutting process, and prolonging the service life of the large taper wire cutting device. Moreover, the swing heads on the upper and lower mechanical arms are adjusted in a follow-up way by the swing head rotating mechanisms in coordination with a cutting taper, the rotation magnitude of the swing head is determined by the height value of the Z axis and the displacement of the V axis, the position compensation of the swing head is considered according to the displacement of the U axis and the displacement of the V axis at the same time, the universal wire guide wheels are used to cooperate with the corresponding upper and lower swing heads, and the tensioning mechanisms between the universal wire guide wheels and the directional wire guide wheels are used for transition to ensure the smooth transition of the electrode wire, so that the electrode wire is effectively prevented from sliding off during large taper cutting, the control of the follow-up deflection position of the electrode wire is also very accurate, and the accuracy of the large taper wire cutting process is improved.
(2) In the follow-up swing head type large taper wire cutting device of the present invention, an upper swing head rotating mechanism and a lower swing head rotating mechanism have the same structure and each include a gearbox and a servo motor, the servo motor is in transmission connection with the corresponding upper swing head or lower swing head through the gearbox, and the upper and lower swing heads are controlled by the servo motor, so that the follow-up adjustment of the upper and lower swing heads is easy to realize through a control system, the control is more convenient, and the control accuracy of the swing angle and position compensation of the swing head is higher.
(3) In the follow-up swing head type large taper wire cutting device of the present invention, the upper swing head and the lower swing head have the same structure and each include a swing head bracket, a rotation axis and a swing wire guide wheel, an axial line of the rotation axis is perpendicular to an axial line of the swing wire guide wheel, and the axial line of the rotation axis is located on a neutral plane of the swing wire guide wheel, so that when the electrode wire rotates around the swing wire guide wheel, the position and compensation of the electrode wire are easy to calculate by the control system.
(4) In the follow-up swing head type large taper wire cutting device of the present invention, the tensioning mechanism includes a support, a slide block, a tensioning wire guide wheel and a balancing weight. The slide block is slidably mounted in a vertical guide chute of the support, the tensioning wire guide wheel is mounted on the slide block, and a lower end of the slide block is connected with the balancing weight through a pull rope. With the tensioning mechanism, the structure is simple, the tensioning force can be adjusted by the balancing weight, and the adjustment is simple and convenient. Furthermore, the width of the race of the tensioning wire guide wheel is greater than the width of the race of the universal wire guide wheel and the directional wire guide wheel. When the swing head rotates greatly, the turning of the electrode wire can be relieved, so that the electrode wire can realize smooth transition when moving from the universal wire guide wheel to the directional wire guide wheel.
(5) In the follow-up swing head type large taper wire cutting device of the present invention, the wire moving mechanism includes a wire traveling mechanism and an electrode wire disc. The electrode wire disc is used for releasing the electrode wire, and the wire traveling mechanism is used for pulling the electrode wire to move. The structure is simple, the electrode wire can move stably and reliably, and the wire cutting process is stable and reliable.

(6) In the follow-up swing head type large taper wire cutting device of the present invention, the wire traveling mechanism pulls the electrode wire by clamping the electrode wire with upper and lower pressure rollers, the pressing or separation of the upper and lower pressure rollers is controlled by a cylinder reversing valve, and the fixed pressure roller adopts a roller with a motor transmission device inside. The overall structure of the wire traveling mechanism is compact, the electrode wire travels stably, and the control is simple and convenient.

Figure 1:
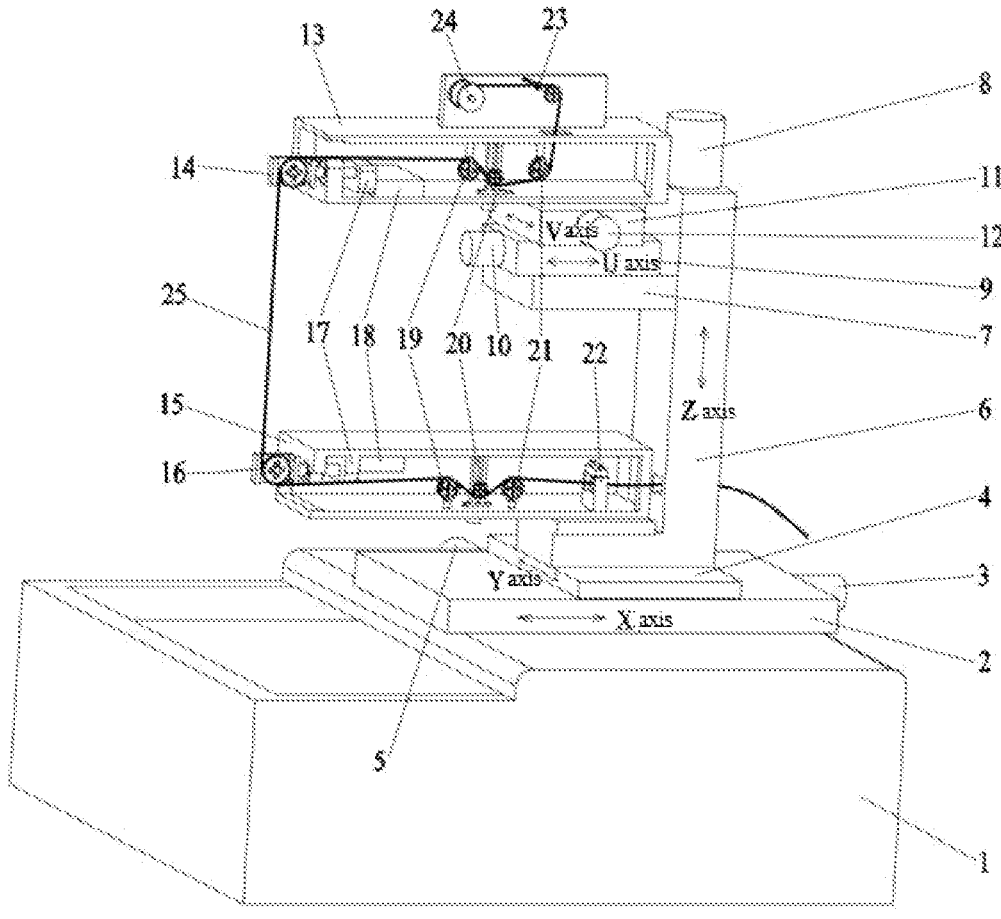
FIG. 1 is a schematic structural diagram of a follow-up swing head type large taper wire cutting device of the present invention (an electrode wire is in a vertical state).

LIST OF REFERENCE NUMERALS 1. bed; 2. X-axis table; 3. X-axis drive mechanism; 4. Y-axis table; 5. Y-axis drive mechanism; 6. spindle; 7. Z-axis table; 8. Z-axis drive mechanism; 9. U-axis table; 10. U-axis drive mechanism; 11. V-axis table; 12. V-axis drive mechanism; 13. upper mechanical arm; 14. upper swing head; 15. lower mechanical arm; 16. lower swing head; 17. gearbox; 18. servo motor; 19. universal wire guide wheel; 20. tensioning mechanism; 20-1. support; 20-2. slide block; 20-3. tensioning wire guide wheel; 20-4. balancing weight; 21. directional wire guide wheel; 22. wire traveling mechanism; 22-1. mounting frame; 22-2. fixed pressure roller; 22-3. reversing valve and cylinder; 22-4. piston rod; 22-5. clamping pressure roller; 22-6. carbon brush; 23. wire collecting ring; 24. electrode wire disc; 25. electrode wire; 26. workpiece; 27. swing head bracket; 28. rotation axis; and 29. swing wire guide wheel.

DETAILED DESCRIPTION OF THE EMBODIMENTS

In order to further understand the content of the present invention, the present invention will be described in detail with reference to the accompanying drawings and embodiments.

EMBODIMENT

Figure 2:
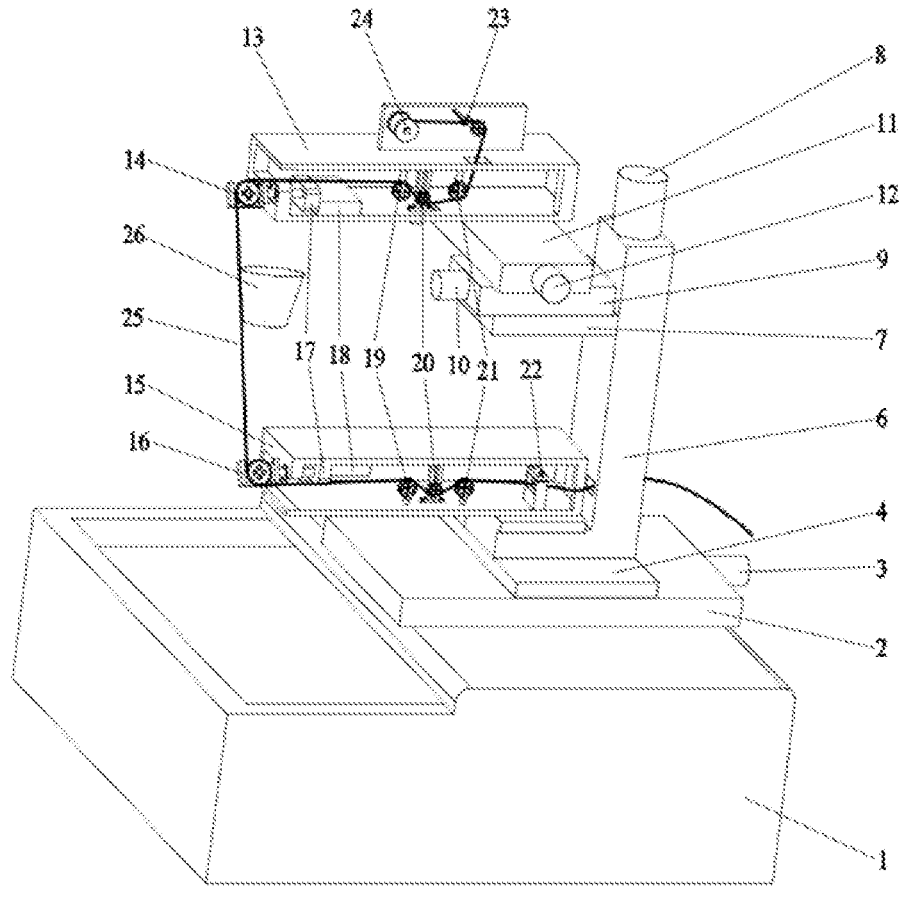
FIG. 2 is a schematic structural diagram of a follow-up swing head type large taper wire cutting device of the present invention (an electrode wire is in an inclined state).

With reference to FIG. 1 and FIG. 2, a follow-up swing head type large taper wire cutting device in this embodiment includes a bed 1, an X-axis table 2, an X-axis drive mechanism 3, a Y-axis table 4, a Y-axis drive mechanism 5, a spindle 6, a Z-axis table 7, a Z-axis drive mechanism 8, a U-axis table 9, a U-axis drive mechanism 10, a V-axis table 11, a V-axis drive mechanism 12, an upper mechanical arm 13, an upper swing head 14, a lower mechanical arm 15, a lower swing head 16, an electrode wire 25 and a wire moving mechanism. The bed 1 is configured to support the entire wire cutting device, the X-axis table 2 is mounted on the bed 1 through the X-axis drive mechanism 3, the Y-axis table 4 is mounted on the X-axis table 2 through the Y-axis drive mechanism 5, the spindle 6 is vertically mounted on the Y-axis table 4, the lower mechanical arm 15 is fixedly mounted at a lower end of the spindle 6 or on the Y-axis table 4, the lower swing head 16 is mounted at a front end of the lower mechanical arm 15 through a lower swing head rotating mechanism, the Z-axis table 7 is mounted on the spindle 6 through the Z-axis drive mechanism 8, the U-axis table 9 is mounted on the Z-axis table 7 through the U-axis drive mechanism 10, the V-axis table 11 is mounted on the U-axis table 9 through the V-axis drive mechanism 12, the upper mechanical arm 13 is fixedly mounted on the V-axis table 11, the upper swing head 14 is mounted at a front end of the upper mechanical arm 13 through an upper swing head rotating mechanism, and the upper mechanical arm 13 is parallel to the lower mechanical arm 15. The cooperative relationship among the X-axis table 2, the X-axis drive mechanism 3, the Y-axis table 4, the Y-axis drive mechanism 5, the Z-axis table 7, the Z-axis drive mechanism 8, the U-axis table 9, the U-axis drive mechanism 10, the V-axis table 11 and the V-axis drive mechanism 12 is the same as that in the existing wire cutting equipment, and a motor-driven ball screw nut transmission mechanism can be used for driving the corresponding table to move. The moving direction of the U-axis table 9 is parallel to the moving direction of the X-axis table 2, and the moving direction of the V-axis table 11 is parallel to the moving direction of the Y-axis table 4. With the above structural design, on the basis of constructing X-axis, Y-axis and Z-axis numerical control devices on the bed 1, a U axis and a V axis are established on a Z axis and can move up and down with the Z axis, the upper mechanical arm 13 is mounted on the V-axis table, and the weight of the upper mechanical arm 13 is reduced, thereby facilitating the improvement of the operation stability and reliability of the U-axis and V-axis drive mechanisms, reducing the vibration of the upper mechanical arm during processing, improving the accuracy of the wire cutting process, and prolonging the service life of the large taper wire cutting device. Furthermore, both the upper mechanical arm 13 and the lower mechanical arm 15 are of a cavity structure. Specifically, an opening can be formed in one sides of the upper mechanical arm 13 and the lower mechanical arm 15 to form "["-shaped cross-sectional structures. Universal wire guide wheels 19, tensioning mechanisms 20 and directional wire guide wheels 21 are respectively arranged in the upper mechanical arm 13 and the lower mechanical arm 15. The universal wire guide wheel 19 can freely rotate and automatically swing under the control of the pulling force of the electrode wire 25 according to the rotation of the swing head, the directional wire guide wheel 21 can freely rotate but cannot swing, and the tensioning mechanism 20 is used for tensioning the electrode wire 25 so that the electrode wire 25 cannot slide off randomly. The upper swing head 14, the universal wire guide wheel 19, the tensioning mechanism 20 and the directional wire guide wheel 21 on the upper mechanical arm 13 constitute an upper wire guide mechanism, and the lower swing head 16, the universal wire guide wheel 19, the tensioning mechanism 20 and the directional wire guide wheel 21 on the lower mechanical arm 15 constitute a lower wire guide mechanism. The electrode wire 25 is led out by the wire moving mechanism, sequentially passes through the directional wire guide wheel 21, the tensioning mechanism 20 and the universal wire guide wheel 19 in the upper mechanical arm 13, is then wound on the upper swing head 14 and turned by the upper swing head 14, and is then wound on the lower swing head 16, and the electrode wire 25 turned by the lower swing head 16 sequentially passes through the universal wire guide wheel 19, the tensioning mechanism 20 and the directional wire guide wheel 21 in the lower mechanical arm 15. The upper swing head 14 and the lower swing head 16 are adjusted in a follow-up way by the swing head rotating mechanisms in coordination with a cutting taper, the rotation magnitude of the swing head is determined by the height value of the Z axis and the displacement of the V axis, the position compensation of the swing head is considered according to the displacement of the U axis and the displacement of the V axis at the same time, the universal wire guide wheels 19 are used to cooperate with the corresponding upper and lower swing heads, and the tensioning mechanisms 20 between the universal wire guide wheels 19 and the directional wire guide wheels 21 are used for transition to ensure the smooth transition of the electrode wire 25, so that the electrode wire 25 is effectively prevented from sliding off during large taper cutting, the control of the follow-up deflection position of the electrode wire 25 is also very accurate, and the accuracy of the large taper wire cutting process is improved.

Figure 4:
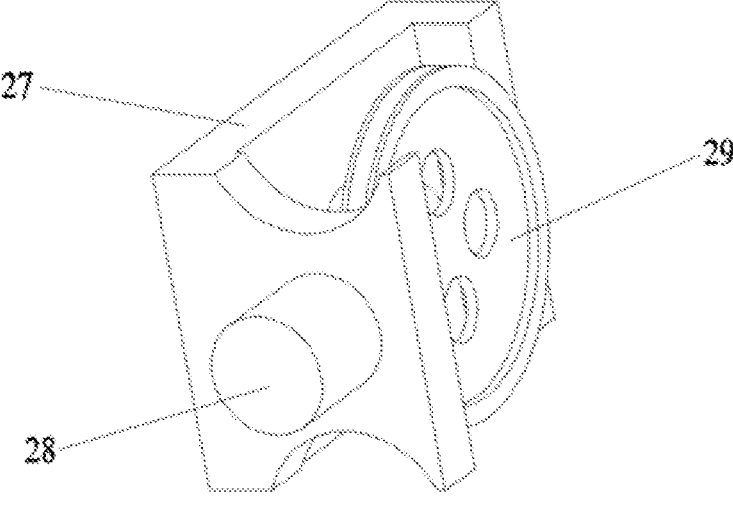
FIG. 4 is a schematic structural diagram of upper and lower swing heads in the present invention.

With continuous reference to FIG. 1 and FIG. 2, in this embodiment, the universal wire guide wheels 19, the tensioning mechanisms 20 and the directional wire guide wheels 21 in the upper mechanical arm 13 and the lower mechanical arm 15 are sequentially arranged from the near to the distant relative to the corresponding upper swing head 14 or lower swing head 16. That is, the upper wire guide mechanism is sequentially provided with the upper swing head 14, the universal wire guide wheel 19, the tensioning mechanism 20 and the directional wire guide wheel 21 from front to back, and the lower wire guide mechanism is sequentially provided with the lower swing head 16, the universal wire guide wheel 19, the tensioning mechanism 20 and the directional wire guide wheel 21 from front to back. In this way, when the upper swing head 14 and the lower swing head 16 swing at a relatively large angle, the corresponding universal wire guide wheel 19 also swings accordingly. Moreover, by using the tensioning mechanism 20 for transition, the electrode wire 25 can maintain a small angle change on the directional wire guide wheel 21, thereby effectively preventing the electrode wire 25 from sliding off from the upper and lower swing heads, the universal wire guide wheel 19, the tensioning mechanism 20 and the directional wire guide wheel 21, and improving the stability and reliability of the large taper wire cutting process. In this embodiment, the upper swing head rotating mechanism and the lower swing head rotating mechanism have the same structure and each include a gearbox 17 and a servo motor 18, the gearbox 17 and the servo motor 18 are mounted on the corresponding upper mechanical arm 13 or lower mechanical arm 15, the servo motor 18 is in transmission connection with the corresponding upper swing head 14 or lower swing head 16 through the gearbox 17. That is, the servo motor 18 on the upper mechanical arm 13 is connected with the upper swing head 14 through the gearbox 17, the servo motor 18 on the lower mechanical arm 15 is connected with the lower swing head 16 through the gearbox 17, and the swing rotation magnitude of the upper swing head 14 and the lower swing head 16 is controlled by the servo motor, so that the follow-up adjustment of the upper and lower swing heads is easy to realize through a control system, the control is more convenient, and the control accuracy of the swing angle and position compensation of the swing head is higher. The upper swing head 14 and the lower swing head 16 also have the same structure shown in FIG. 4 and each include a swing head bracket 27, a rotation axis 28 and a swing wire guide wheel 29. An axle of the swing wire guide wheel 29 is mounted on the swing head bracket 27 and can freely rotate on the swing head bracket 27, the rotation axis 28 is fixed to the swing head bracket 27, an axial line of the rotation axis 28 is perpendicular to an axial line of the swing wire guide wheel 29, and the axial line of the rotation axis 28 is located on a neutral plane of the swing wire guide wheel 29, so that when the electrode wire 25 rotates around the swing wire guide wheel 29, the position and compensation of the electrode wire are easy to calculate by the control system. The rotation axis 28 is mounted at the front end of the corresponding upper mechanical arm 13 or lower mechanical arm 15 through a bearing, and the rotation axis 28 is in transmission connection with an output axis of the gearbox 17 of the corresponding upper swing head rotating mechanism or lower swing head rotating mechanism. In order to prevent the contact friction between the electrode wire 25 and the swing head bracket 27, an avoiding gap may also be formed at the positions of the upper and lower ends of the swing head bracket 27 corresponding to a race of the swing wire guide wheel 29, so that when the swing wire guide wheel 29 swings at a large angle, the electrode wire can also be prevented from contacting with the swing head bracket 27.

Figure 3:
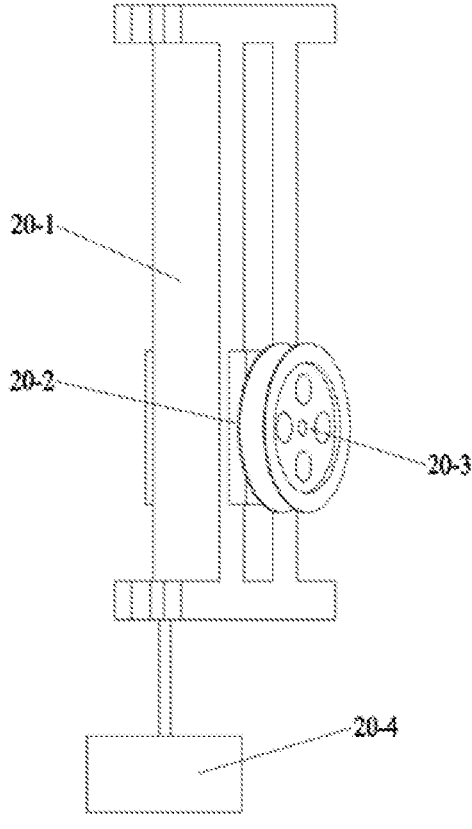
FIG. 3 is a schematic structural diagram of a tensioning mechanism in the present invention.

As shown in FIG. 3, in this embodiment, the tensioning mechanism 20 includes a support 20-1, a slide block 20-2, a tensioning wire guide wheel 20-3 and a balancing weight 20-4. The slide block 20-2 is slidably mounted in a vertical guide chute of the support 20-1 and can freely slide up and down on the support 20-1, the tensioning wire guide wheel 20-3 is mounted on the slide block 20-2, and a lower end of the slide block 20-2 is connected with the balancing weight 20-4 through a pull rope. During winding, the electrode wire 25 is wound on a lower part of the tensioning wire guide wheel 20-3. With the tensioning mechanism 20, the structure is simple and compact, the tensioning force can be adjusted by the balancing weight 20-4, and the adjustment is simple and convenient. The balancing weight 20-4 is preferably a weight which is convenient for quantitatively adjusting the tensioning force of the electrode wire 25. In this embodiment, further preferably, the width of the race of the tensioning wire guide wheel 20-3 is greater than the width of the race of the universal wire guide wheel 19 and the directional wire guide wheel 21. That is, in the large taper wire cutting process, smooth transition of an inclination angle of the electrode wire 25 between the universal wire guide wheel 19 and the directional wire guide wheel 21 can be realized through the tensioning wire guide wheel 20-3, thereby relieving the turning of the electrode wire 25.

Figure 5A:
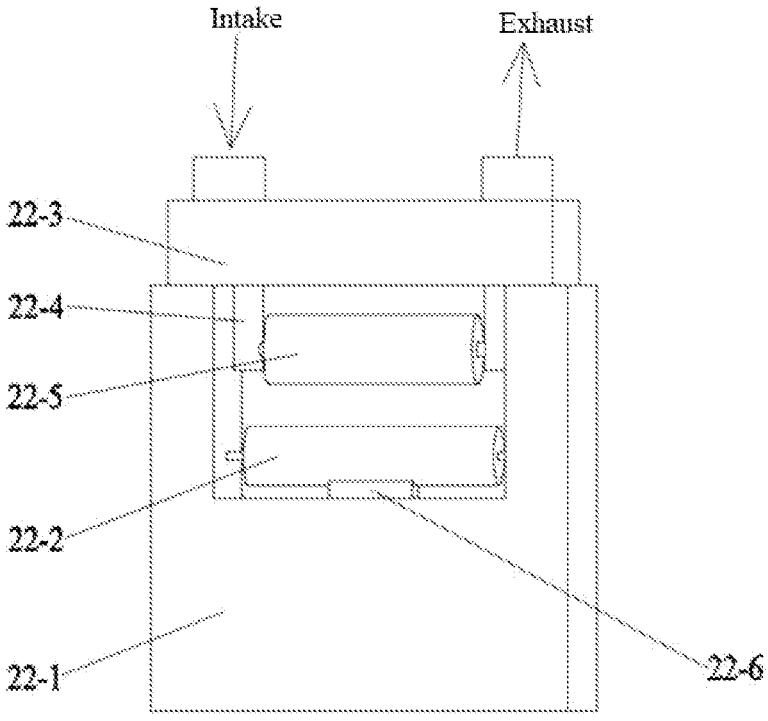
FIG. 5A is a schematic diagram of a wire traveling mechanism in a separated state in the present invention.
Figure 5B:
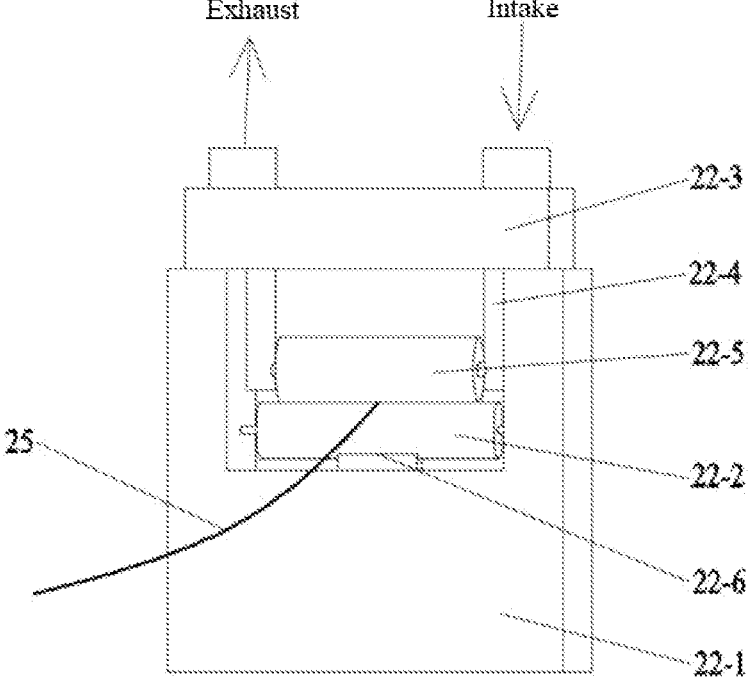
FIG. 5B is a schematic diagram of a wire traveling mechanism in a clamped state in the present invention.

In the follow-up swing head type large taper wire cutting device of this embodiment, the wire moving mechanism can be designed according to different types of wire cutting devices, and the wire moving mechanism may adopt a wire moving system in an existing wire cutting device. As shown in FIG. 1 and FIG. 2, specifically, in this embodiment, the wire moving mechanism includes a wire traveling mechanism 22 and an electrode wire disc 24. The electrode wire disc 24 is mounted on the upper mechanical arm 13 through a wire disc mounting frame, and the wire traveling mechanism 22 is mounted in the lower mechanical arm 15 and is located at a rear part of the directional wire guide wheel 21 in the lower mechanical arm 15. The electrode wire 25 is led out by the electrode wire disc 24, sequentially passes through the directional wire guide wheel 21, the tensioning mechanism 20 and the universal wire guide wheel 19 in the upper mechanical arm 13, is then wound on the upper swing head 14 and turned by the upper swing head 14, and is then wound on the lower swing head 16, and the electrode wire 25 turned by the lower swing head 16 sequentially passes through the universal wire guide wheel 19, the tensioning mechanism 20 and the directional wire guide wheel 21 in the lower mechanical arm 15, and then enters the wire traveling mechanism 22. The electrode wire disc 24 releases the electrode wire 25, and the wire traveling mechanism 22 pulls the electrode wire 25 to move. The structure is simple, the electrode wire 25 can move stably and reliably, and the wire cutting process is stable and reliable. In addition, a wire collecting ring 23 mounted on the wire disc mounting frame is also arranged on one side of the electrode wire disc 24, and the electrode wire 25 in the electrode wire disc 24 is led out and then passes through the wire collecting ring 23. As shown in FIG. 5A and FIG. 5B, the wire traveling mechanism 22 in this embodiment includes a mounting frame 22-1, a fixed pressure roller 22-2, a reversing valve and cylinder 22-3, a piston rod 22-4, a clamping pressure roller 22-5 and a carbon brush 22-6. The mounting frame 22-1 is fixed in the lower mechanical arm 15, the fixed pressure roller 22-2 adopts a roller with a motor transmission device inside, the fixed pressure roller 22-2 is available in the market and has a compact structure, the fixed pressure roller 22-2 is mounted on the mounting frame 22-1 and is slidably connected with the carbon brush 22-6, the carbon brush 22-6 is electrically connected with a power source so as to supply the processing current of the power source to the electrode wire 25 through the carbon brush 22-6 and the fixed pressure roller 22-2, the reversing valve and cylinder 22-3 is fixed to an upper part of the mounting frame 22-1, the clamping pressure roller 22-5 is mounted on the piston rod 22-4 of the cylinder in the reversing valve and cylinder 22-3, the clamping pressure roller 22-5 is located at an upper part of the fixed pressure roller 22-2, and an axial line of the clamping pressure roller 22-5 is parallel to an axial line of the fixed pressure roller 22-2. When the electrode wire 25 needs to be clamped, the reversing valve controls the piston rod 22-4 of the cylinder to drive the clamping pressure roller 22-5 to move downward, so that the clamping pressure roller 22-5 is engaged with the fixed pressure roller 22-2 to clamp the electrode wire 25 (as shown in FIG. 5B). The motor inside the fixed pressure roller 22-2 drives the fixed pressure roller 22-2 to rotate through a transmission mechanism, so as to pull the electrode wire 25 to move, commonly known as "wire moving" or "wire traveling". The fixed pressure roller 22-2 is also connected with the carbon brush 22-6 so as to supply the processing current of the power source to the electrode wire 25 through the carbon brush device and the fixed pressure roller 22-2. When the electrode wire needs to be loosened, the action is opposite, that is, the reversing valve controls the piston rod 22-4 of the cylinder to move upward, so that the clamping pressure roller 22-5 is separated from the fixed pressure roller 22-2 (as shown in FIG. 5A).

As shown in FIG. 1, when the follow-up swing head type large taper wire cutting device of this embodiment is in an initial position, the U and V axes are in an initial state. That is, the electrode wire 25 in a processing region is in a vertical state, and a plane perpendicular to X and Y planes of a machine tool can be cut and processed by only moving X and Y axes. As shown in FIG. 2, in the cutting process, when the U and V axes move, the electrode wire 25 inclines, so that a special-shaped workpiece 26 can be cut. When the U and V axes move, the electrode wire 25 in the processing region inclines, at the moment, a wire cutting control system calculates an inclination angle of the electrode wire 25 in the processing region according to the height value of the Z axis and the displacement of the V axis. At the same time, the corresponding servo motor 18 is controlled to drive the upper and lower swing heads to adaptively swing, so that the neutral planes of the swing wire guide wheels 29 of the upper and lower swing heads are coplanar with the electrode wire 25 in the processing region. Since the swing of the upper and lower swing heads causes the position of the electrode wire 25 to change accordingly, the wire cutting control system simultaneously calculates the compensation for the change of the position of the electrode wire 25 according to the displacements of the U and V axes. In the wire moving system, the swing of the upper and lower swing heads causes the electrode wires 25 in the upper mechanical arm 13 and the lower mechanical arm 15 to incline accordingly, and at the moment, the corresponding universal wire guide wheel 19 also has a corresponding deflection under the action of the electrode wire 25, so that the electrode wire 25 cannot slide off from the universal wire guide wheel 19. Moreover, the electrode wire 25 is wound around the directional wire guide wheel 21 through the tensioning mechanism 20, and the inclination of the electrode wire 25 can accurately point to the directional wire guide wheel 21 after the smooth transition by the tensioning mechanism 20, thereby effectively eliminating the inclination of the electrode wire 25 on the directional wire guide wheel 21, and ensuring the stable and high-accuracy operation of the large taper wire cutting process.

Other composition systems in the wire cutting device are the same as those in the prior art, such as a wire cutting control system, a pulse circuit system and an electrolyte cooling system, which do not belong to the improvements of the present invention and will not be described in detail here.

In the follow-up swing head type large taper wire cutting device of the present invention, the swing heads on the upper and lower mechanical arms are adjusted in a follow-up way by the swing head rotating mechanisms in coordination with a cutting taper, the universal wire guide wheels are used to cooperate with the corresponding upper and lower swing heads, and the tensioning mechanisms between the universal wire guide wheels and the directional wire guide wheels are used for transition to ensure the smooth transition of the electrode wire, so that the electrode wire is effectively prevented from sliding off during large taper cutting, and the control of the follow-up deflection position of the electrode wire is also very accurate. At the same time, the U axis and the V axis are arranged on the Z-axis table, the upper mechanical arm is mounted on the V-axis table, and the weight of the upper mechanical arm is reduced, thereby facilitating the improvement of the operation stability and reliability of the U-axis and V-axis drive mechanisms, reducing the vibration of the upper mechanical arm during processing, improving the accuracy of the wire cutting process, and prolonging the service life of the large taper wire cutting device.

It should be noted that when an element is considered to be "fixed" to another element, the element may be directly fixed to another element or there may be an intermediate element. When an element is considered to be "connected" to another element, the element may be directly connected to the another element or there may be an intermediate element at the same time. The terms "vertical", "horizontal", "left", "right" and similar expressions used herein are for the purpose of illustration only and do not represent the only embodiment.

Unless otherwise defined, all technical and scientific terms used herein have the same meanings as commonly understood by those skilled in the art of the present invention. The terms used herein are only for the purpose of describing specific embodiments, and are not intended to limit the present invention.

The present invention and the embodiment thereof are schematically described above, and the description is not restrictive. The structure shown in the accompanying drawings is only one of the implementations of the present invention, and the actual structure is not limited thereto. Therefore, if those of ordinary skill in the art are inspired, without departing from the inventive purpose of the present invention, any structure and embodiment similar to the technical solution designed without creativity shall fall within the protection scope of the present invention.

What is claimed is:

1. A follow-up swing head type large taper wire cutting device, comprising: a bed, an X-axis table, an X-axis drive mechanism, a Y-axis table, a Y-axis drive mechanism, a spindle, a Z-axis table, a Z-axis drive mechanism, a U-axis table, a U-axis drive mechanism, a V-axis table, a V-axis drive mechanism, an upper mechanical arm, an upper swing head, a lower mechanical arm, a lower swing head, an electrode wire and a wire moving mechanism, wherein the X-axis table is mounted on the bed through the X-axis drive mechanism, the Y-axis table is mounted on the X-axis table through the Y-axis drive mechanism, the spindle is vertically mounted on the Y-axis table, the lower mechanical arm is fixedly mounted at a lower end of the spindle or the lower mechanical arm is fixedly mounted on the Y-axis table, the lower swing head is mounted at a front end of the lower mechanical arm through a lower swing head rotating mechanism, the Z-axis table is mounted on the spindle through the Z-axis drive mechanism, the U-axis table is mounted on the Z-axis table through the U-axis drive mechanism, the V-axis table is mounted on the U-axis table through the V-axis drive mechanism, the upper mechanical arm is fixedly mounted on the V-axis table, the upper swing head is mounted at a front end of the upper mechanical arm through an upper swing head rotating mechanism, and the upper mechanical arm is parallel to the lower mechanical arm; and a universal wire guide wheel, a tensioning mechanism and a directional wire guide wheel are arranged in the upper mechanical arm and the lower mechanical arm, respectively, the electrode wire is led out by the wire moving mechanism, the electrode wire sequentially passes through the directional wire guide wheel, the tensioning mechanism and the universal wire guide wheel in the upper mechanical arm, the electrode wire is wound on the upper swing head and the electrode wire is turned by the upper swing head, and the electrode wire is wound on the lower swing head, and the electrode wire turned by the lower swing head sequentially passes through the universal wire guide wheel, the tensioning mechanism and the directional wire guide wheel in the lower mechanical arm.

2. The device according to claim 1, wherein the universal wire guide wheel, the tensioning mechanism and the directional wire guide wheel in the upper mechanical arm are sequentially arranged from the near to the distant relative to the upper swing head and the universal wire guide wheel, the tensioning mechanism and the directional wire guide wheel in the lower mechanical arm are sequentially arranged from the near to the distant relative to the lower swing head.

3. The device according to claim 2, wherein the upper swing head rotating mechanism and the lower swing head rotating mechanism have the same structure and each of the upper swing head rotating mechanism and the lower swing head rotating mechanism comprises a gearbox and a servo motor, and the servo motor is in a transmission connection with the upper swing head or the lower swing head through the gearbox.

4. The device according to claim 3, wherein the upper swing head and the lower swing head have the same structure and each of the upper swing head and the lower swing head comprises a swing head bracket, a rotation axis and a swing wire guide wheel, wherein an axle of the swing wire guide wheel is mounted on the swing head bracket, the rotation axis is fixed to the swing head bracket, an axial line of the rotation axis is perpendicular to an axial line of the swing wire guide wheel, the axial line of the rotation axis is located on a neutral plane of the swing wire guide wheel, the rotation axis is mounted at the front end of the upper mechanical arm or the front end of the lower mechanical arm through a bearing, and the rotation axis is in the transmission connection with an output axis of the gearbox of the upper swing head rotating mechanism or an output axis of the gearbox of the lower swing head rotating mechanism.

5. The device according to claim 4, wherein the tensioning mechanism comprises a support, a slide block, a tensioning wire guide wheel and a balancing weight, wherein the slide block is slidably mounted in a vertical guide chute of the support, the tensioning wire guide wheel is mounted on the slide block, and a lower end of the slide block is connected with the balancing weight through a pull rope.

6. The device according to claim 4, wherein the wire moving mechanism comprises a wire traveling mechanism and an electrode wire disc;

the electrode wire disc is mounted on the upper mechanical arm through a wire disc mounting frame, and the wire traveling mechanism is mounted in the lower mechanical arm and the wire traveling mechanism is located at a rear part of the directional wire guide wheel in the lower mechanical arm; and the electrode wire is led out by the electrode wire disc, the electrode wire sequentially passes through the directional wire guide wheel, the tensioning mechanism and the universal wire guide wheel in the upper mechanical arm, the electrode wire is wound on the upper swing head and the electrode wire is turned by the upper swing head, and the electrode wire is wound on the lower swing head, and the electrode wire turned by the lower swing head sequentially passes through the universal wire guide wheel, the tensioning mechanism and the directional wire guide wheel in the lower mechanical arm, and the electrode wire turned by the lower swing head enters the wire traveling mechanism.

7. The device according to claim 3, wherein the tensioning mechanism comprises a support, a slide block, a tensioning wire guide wheel and a balancing weight, wherein the slide block is slidably mounted in a vertical guide chute of the support, the tensioning wire guide wheel is mounted on the slide block, and a lower end of the slide block is connected with the balancing weight through a pull rope.

8. The device according to claim 3, wherein the wire moving mechanism comprises a wire traveling mechanism and an electrode wire disc;

the electrode wire disc is mounted on the upper mechanical arm through a wire disc mounting frame, and the wire traveling mechanism is mounted in the lower mechanical arm and the wire traveling mechanism is located at a rear part of the directional wire guide wheel in the lower mechanical arm; and the electrode wire is led out by the electrode wire disc, the electrode wire sequentially passes through the directional wire guide wheel, the tensioning mechanism and the universal wire guide wheel in the upper mechanical arm, the electrode wire is wound on the upper swing head and the electrode wire is turned by the upper swing head, and the electrode wire is wound on the lower swing head, and the electrode wire turned by the lower swing head sequentially passes through the universal wire guide wheel, the tensioning mechanism and the directional wire guide wheel in the lower mechanical arm, and the electrode wire turned by the lower swing head enters the wire traveling mechanism.

9. The device according to claim 2, wherein the tensioning mechanism comprises a support, a slide block, a tensioning wire guide wheel and a balancing weight, wherein the slide block is slidably mounted in a vertical guide chute of the support, the tensioning wire guide wheel is mounted on the slide block, and a lower end of the slide block is connected with the balancing weight through a pull rope.

10. The device according to claim 2, wherein the wire moving mechanism comprises a wire traveling mechanism and an electrode wire disc;

the electrode wire disc is mounted on the upper mechanical arm through a wire disc mounting frame, and the wire traveling mechanism is mounted in the lower mechanical arm and the wire traveling mechanism is located at a rear part of the directional wire guide wheel in the lower mechanical arm; and the electrode wire is led out by the electrode wire disc, the electrode wire sequentially passes through the directional wire guide wheel, the tensioning mechanism and the universal wire guide wheel in the upper mechanical arm, the electrode wire is wound on the upper swing head and the electrode wire is turned by the upper swing head, and the electrode wire is wound on the lower swing head, and the electrode wire turned by the lower swing head sequentially passes through the universal wire guide wheel, the tensioning mechanism and the directional wire guide wheel in the lower mechanical arm, and the electrode wire turned by the lower swing head enters the wire traveling mechanism.

11. The device according to claim 1, wherein the tensioning mechanism comprises a support, a slide block, a tensioning wire guide wheel and a balancing weight, wherein the slide block is slidably mounted in a vertical guide chute of the support, the tensioning wire guide wheel is mounted on the slide block, and a lower end of the slide block is connected with the balancing weight through a pull rope.

12. The device according to claim 11, wherein a width of a race of the tensioning wire guide wheel is greater than a width of a race of the universal wire guide wheel and a width of a race of the directional wire guide wheel.

13. The device according to claim 12, wherein the balancing weight is a weight.

14. The device according to claim 1, wherein the wire moving mechanism comprises a wire traveling mechanism and an electrode wire disc;

the electrode wire disc is mounted on the upper mechanical arm through a wire disc mounting frame, and the wire traveling mechanism is mounted in the lower mechanical arm and the wire traveling mechanism is located at a rear part of the directional wire guide wheel in the lower mechanical arm; and the electrode wire is led out by the electrode wire disc-, the electrode wire sequentially passes through the directional wire guide wheel, the tensioning mechanism and the universal wire guide wheel in the upper mechanical arm, the electrode wire is then-wound on the upper swing head and the electrode wire is turned by the upper swing head, and the electrode wire is wound on the lower swing head, and the electrode wire turned by the lower swing head sequentially passes through the universal wire guide wheel, the tensioning mechanism and the directional wire guide wheel in the lower mechanical arm, and the electrode wire turned by the lower swing head enters the wire traveling mechanism.

15. The device according to claim 14, wherein a wire collecting ring is further arranged on one side of the electrode wire disc, wherein the wire collecting ring is-mounted on the wire disc mounting frame, and the electrode wire in the electrode wire disc is led out and the electrode wire in the electrode wire disc passes through the wire collecting ring.

16. The device according to claim 8, wherein the wire traveling mechanism comprises a mounting frame, a fixed pressure roller, a reversing valve and cylinder, a piston rod, a clamping pressure roller and a carbon brush, wherein the fixed pressure roller is configured to be a roller with a motor transmission device inside, the fixed pressure roller is mounted on the mounting frame and the fixed pressure roller is slidably connected with the carbon brush, the carbon brush is electrically connected with a power source to supply a processing current of the power source to the electrode wire through the carbon brush and the fixed pressure roller, the reversing valve and cylinder is fixed to an upper part of the mounting frame, the clamping pressure roller is mounted on the piston rod of a cylinder in the reversing valve and cylinder, the clamping pressure roller is located at an upper part of the fixed pressure roller, and an axial line of the clamping pressure roller is parallel to an axial line of the fixed pressure roller.

* * * * *